United States Patent [19]

Reinicke

[11] Patent Number: 5,139,047
[45] Date of Patent: Aug. 18, 1992

[54] MINIATURE CHECK VALVE CONSTRUCTION

[75] Inventor: Robert H. Reinicke, Mission Viejo, Calif.

[73] Assignee: Marotta Scientific Controls, Inc., Montville, N.J.

[21] Appl. No.: 767,123

[22] Filed: Sep. 27, 1991

[51] Int. Cl.⁵ .................... F16K 15/02; B21D 39/00; B21D 41/00
[52] U.S. Cl. ................ 137/543.21; 137/540; 251/368; 29/890.13
[58] Field of Search ............ 137/540, 539, 539.5, 137/533.11, 543.17, 543.19, 543.21; 251/368; 29/890.12, 890.126, 890.13

[56] References Cited

U.S. PATENT DOCUMENTS

| | | | |
|---|---|---|---|
| 2,797,704 | 7/1957 | McDermott et al. | 137/543.19 |
| 3,145,724 | 8/1964 | Pelzer | 137/543.21 X |
| 3,228,419 | 1/1966 | Smith et al. | 137/540 |
| 3,387,625 | 6/1988 | Laure | 137/539 X |
| 3,548,868 | 12/1970 | Mullaney, III | 137/543.21 X |
| 3,548,870 | 12/1970 | Morton et al. | 137/540 |
| 3,725,990 | 4/1973 | Petersen et al. | 137/539 X |
| 4,071,045 | 1/1978 | Brandt | 137/533.11 X |
| 4,140,148 | 2/1979 | Richter | 137/543.21 X |
| 4,611,374 | 9/1986 | Schnelle et al. | 29/890.13 |
| 4,766,930 | 8/1988 | Patti | 137/543.21 X |

Primary Examiner—John Rivell
Attorney, Agent, or Firm—Hopgood, Calimafde, Kalil, Blaustein & Judlowe

[57] ABSTRACT

A miniaturized check-valve construction utilizes a length of straight cylindrical tubing for its body, wherein the open ends of the tube are the inlet (or upstream) and outlet (or downstream) ports of the valve. The tubular body is locally deformed to fixedly retain an inserted annular valve-seat member at a first axial location of downstream offset from the inlet end of the pipe. The tubular body is also locally deformed, at a second axial location of upstream offset from the outlet end of the pipe, to fixedly retain another annular member which serves to establish a fixed reference for the downstream end of a compression spring which continuously urges a valve member into its valve-closing relation with the valve-seat member. Various modifications are described for the configuration and retention of internal parts of the check-valve assembly.

17 Claims, 2 Drawing Sheets

MINIATURE CHECK VALVE CONSTRUCTION

BACKGROUND OF THE INVENTION

The invention relates to a check-valve construction which lends itself to miniaturizing, for purposes of economy of space, materials, weight and cost.

Conventional practice in the manufacture of check valves is specially fabricate a valve body involving a body casting that must be machined to define precise surfaces for seating, for inlet/outlet port connections, for valve-member guidance and support, and for spring location to normally urge the valve member to closed position. But such practices become intolerable if such valves are to be miniaturized, as for example, to comply with a weight limitation as low as substantially one gram. And if there is a stringent leakage requirement, the valve member and its seat must be precisely fitted to each other before installation in the valve body, usually requiring an exacting and difficult welding procedure for permanent installation of the precision seat.

BRIEF STATEMENT OF THE INVENTION

It is an object of the invention to provide an improved check-valve construction which inherently lends itself to miniaturization and which avoids manufacturing difficulties of conventional constructions.

It is a specific object to meet the above object with a construction of such miniaturized scale as to meet a weight limitation of substantially one gram for a check valve that is complete with inlet and outlet ports adapted for conventional connection to other elements of a hydraulic circuit.

Another specific object is to provide a construction meeting the above objects as well as other stringent limitations as to low leakage in closed condition, reliable performance, and adaptability to low-cost mass-production.

The invention in a preferred form achieves these objects by utilizing a length of cylindrical tubing as a valve body, wherein the open ends of the tube are the inlet (or upstream) and outlet (or downstream) ports of the valve. The tubular body is locally deformed to fixedly retain a inserted annular valve-seat member at a first axial location of downstream offset from the inlet end of the pipe. The tubular body is also locally deformed, at a second axial location of upstream offset from the outlet end of the pipe, to fixedly retain another annular member which serves to establish a fixed reference for the downstream end of a compression spring which continuously urges a valve member into its valve-closing relation with the valve-seat member. Various modifications are described for the configuration and retention of internal parts of the check-valve assembly.

DETAILED DESCRIPTION

The invention will be described in detail, for a presently preferred embodiment and for other embodiments, in conjunction with the accompanying drawings, in which.

Figure 1:
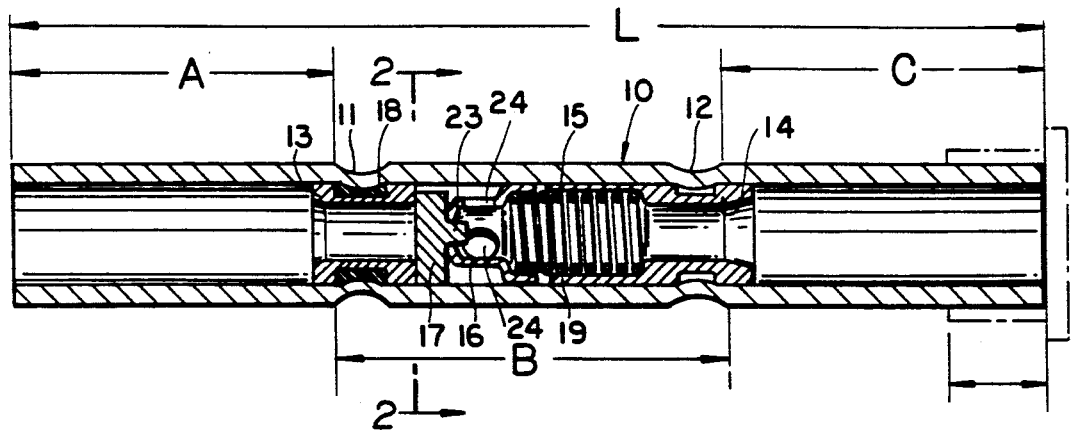
FIG. 1 is an enlarged longitudinal sectional view of the presently preferred embodiment of the invention, shown in valve-closed condition.

In the check-valve construction of FIGS. 1 to 4, an elongate tube 10, of overall length L, provides a first body fraction A serving the inlet-port purposes of the valve, an intermediate-body fraction B serving valve-body purposes of the valve, and a third body fraction C serving the outlet-port purposes of the valve. Fluid flow is permitted only in the left-to-right direction of FIG. 1, being blocked by check-valve closure against fluid flow in the right-to-left direction. The terms "upstream" and "downstream" are sometimes used in reference to axial ends of certain parts of the valve, based on the fact that such flow as is permitted by and through the valve can only be in the downstream direction from inlet-port region A to outlet-port region C.

The operative limits of check-valve components within the intermediate fraction B of tube 10 are defined by first and second circumferentially continuous inward swaging deformations 11, 12 which respectively serve to retain a valve-seat member 13 and a spring end-reference member 14. A coil spring 15 is referenced to member 14 and, via a spring cage 16, applies compressional force to continuously preload a valve member 17 into seated, valve-closing engagement with the valve-seat member.

More particularly, the valve-seat member 13 comprises an annular body having an outer diameter fitted to the bore of tube 10, and member 13 is circumferentially grooved between axial ends. Prior to assembly into tube 10, an elastomeric ring 18 is fitted to this circumferential groove, and the swaging of tube 10 at 11 locally displaces the tube bore into circumferentially sealing inward compression of the elastomeric ring 18 while also establishing a fixed assembly of seal member 1 to tube 10. Preferably, and as shown, no metal-to-metal contact is involved in swaging the tube in order to fix the assembly of seat member 13 thereto; this relation not only assures a reliable seal via the elastomeric ring 18 but also avoids the application of seat-distorting force or strain that might otherwise ensue from a localized metal-to-metal contact.

The end-reference member 14 is also annular, fitted to the tube bore, and externally grooved for permanent assembly to tube 10, upon swaging to create the circumferential deformation of tube 10 at 12. No elastomeric seal is shown or required at this location. Member 14 is sufficiently axially elongate to provide a counterbore 19 and shoulder for nested concentric and axial location of the downstream end of spring 15. The upstream end of spring 15 is seated within a counterbore and against a shoulder, defined by a flange formation 20 (see FIG. 3) at the downstream end of spring cage 16. This flange formation has running clearance with the tube bore.

The flange formation 20 is at the open end of a cupped configuration of the upstream end of cage 16. The cupped configuration comprises a cylindrical skirt portion 21 and an upstream-end closure portion 22 which is shown centrally apertured to receive and centrally locate to a stud 23 that is integrally formed in the downstream face of valve member 17. The skirt portion 21 is at substantial radial offset from the tube bore and is characterized by an angularly spaced plurality of openings 24 for free passage of downstream flow, for an open condition of the check valve.

Figure 2:
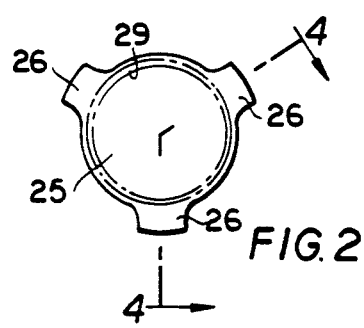
FIG. 2 is a further-enlarged end view in elevation of a poppet-valve component of the valve of FIG. 1, as seen from the plane 2—2 of FIG. 1.
Figure 3:
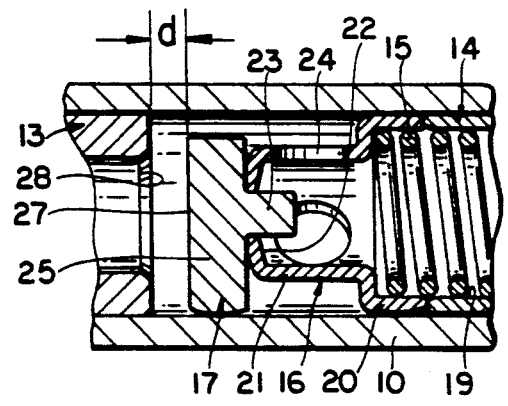
FIG. 3 is a fragmentary longitudinal section, to the scale of FIG. 2, showing operative internal components of the valve of FIG. 1 in valve-open condition.

The valve member or poppet 17 in FIGS. 1 to 3 is seen to comprise a solid generally cylindrical body 25 with three angularly spaced and, integrally formed stabilizing feet 26 having running clearance with the tube bore. The annular arcs of space between feet 26 accommodate downstream flow, for the open condition of the check valve. The upstream face 27 of valve member 17 is preferably flat and of body (25) diameter sufficient to fully register with and lap the similarly flat annular seating surface or land 28 of seat member 13. The annular area of this flat-to-flat seating engagement is indicated by phantom lines 29 in FIG. 2.

Figure 4:
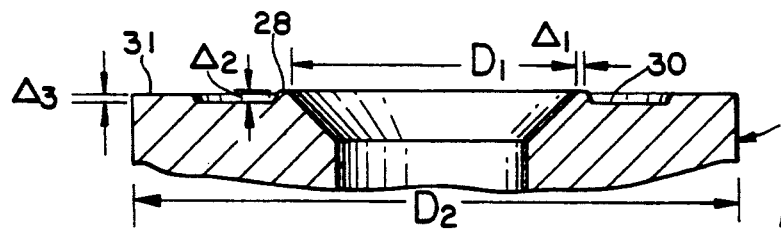
FIG. 4 is a fragmentary view, taken at 4—4 in FIG. 2 and to an even greater enlarged scale, to show profile of the valve-seating surface in the valve of FIG. 1.

FIG. 4 provides detail for a description of the downstream or seating face of seat member 13. The actual seating area or land 28 is seen as a narrow annulus, of inner diameter D, and radial width $\Delta_1$, i.e, Delta, sub one, at the flared mouth of the bore of member 1. The seating land 28 is at the downstream limit of member 13, and the downstream face is axially relieved to the extent $\Delta_2$ over an annular region 30 which is at radial offset from the outer diameter $D_2$ of seat member 13, thereby defining a flat outer annular land 31. Land 31 is sometimes referred to as a bumper land because it assures improved orientation of valve member 17, by engaging one or more of the feet 26 in the course of valve-closing action, especially if valve-member 17 becomes slightly cocked away from radial-plane orientation, in the course of valve closure. The dimension $\Delta_3$ in FIG. 4 indicates a preference for the radial plane of the bumper land 31 to be at only the slightest axial offset from the downstream-limit plane of the seating land 28; such axial offset is suitably in the order of one or two millionths of an inch, for the valve scale in the illustrative dimensions presented below.

Figures 5A, 5B:
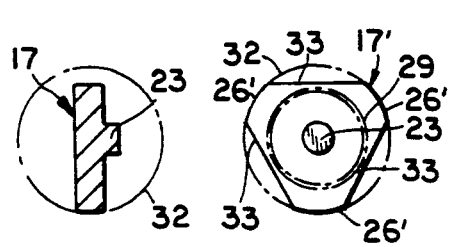
FIG. 5A is a simplified diagram, in the nature of a longitudinal section through the poppet-valve member of the valve of FIG. 1.
FIG. 5B is another simplified diagram, in the nature of an end elevation to the scale of FIG. 5A, to illustrate an alternative poppet-valve member configuration.

FIG. 5A illustrates a feature of valve member (17) construction for avoidance of a cocking condition of the character indicated. If the entire valve-member element 17 of FIG. 2 is considered to be carved from a geometrical sphere centered on the circular-body (25) axis, and of radius to provide the indicated running clearance with the tube bore, then in FIG. 5A the phantom circle 32 describes this geometrical sphere. Necessarily therefore, the outer bore-piloting surfaces of the three feet 26 are of convex spherical configuration, all three of their outer surfaces being in the same geometrical sphere. The possibility of valve-member cocking is reduced to substantially zero, since no valve-member stabilizing contact with the tube bore can ever exceed twice the radius of the geometrical sphere, however much the orientation of the valve member may transiently vary from a strict radial-plane orientation.

FIG. 5B illustrates that the FIG. 5A discussion in the context of the valve member 17 is also applicable to a slightly modified valve member 17' which offers the advantage of reduced cost to manufacture. In FIG. 5B, the valve member 17' is again externally limited to conform to angularly spaced areas of the single geometrical sphere 32. But the involved spaced foot formations 26' result from simple flat milling or other machining to provide equal chords 33 of less than 120° angular extent, between adjacent foot formations 26'. In the case of FIG. 5B, the angular span of each chord 33 is about twice that of each foot formation 26', and the phantom indication 29' of seat-land engagement is seen to be well accommodated within the valve member body which remains after making the chordal truncations.

The described construction will be seen to lend itself to extreme miniaturization, with great economy of weight; in fact, the major fraction of the weight is that of the tube 10 itself, wherein length of inlet/outlet port regions A and C is the primary factor, this length being clearly a customer option or requirement. In a specific check-valve example, wherein tube 10 is of aluminum alloy, 0.188-in outer diameter, 0.025-in wall thickness, and overall length (L) of 1.4 inches, the tube 10 alone weighs 0.82 gram, while weight of the fully assembled check valve is one gram (to the nearest gram). In a nominal fluid-pressure operating environment of about 1700 psig, the pressure differential to "crack" the valve for initial flow from inlet to outlet is about 5 psi, and a pressure differential of about 10 psi develops a full opening displacement d of the poppet 17, the same being limited by spring-cage abutment with the reference member 14, as seen in FIG. 3. The spring-seated poppet prevents ("checks") flow, when pressure differential across the seated valve is in the opposite direction. This pressure differential adds to the spring-preload force, and seating-land stress prevents excessive seat leakage.

For the indicated tube 10 of aluminum alloy, it is advisable that the tube bore be flash-hard anodized, to provide a hard guide surface for displacements of poppet 17 and cage 16 in the tube.

Although it is possible to realize a valve of the character indicated with spherical or with conically fitted seating lands at valve closure, such practices are deemed to be unduly expensive for a miniaturized scaling of the construction. The flat-to-flat seating that has been described is therefore preferred, and in mass-production, there is a tremendous cost-saving in being able to machine-lap literally hundreds of flat seats at a time.

The seat member 13 in the same illustrative miniaturized check valve is suitably of 10% cobalt micrograin tungsten carbide, for relative toughness and impact resistance. The seating face of member 13 is made by diamond-wheel grinding and electrical-discharge machining (edm) to form the seating land 28 and bumper 31. The valve member or poppet 17 is, like the seating face of member 13, also of "flat" style and of tungsten carbide. Suggested manufacture of the poppet commences with a high-quality tungsten carbide ball. One side of the ball is diamond-wheel ground to form the stem or stud 23 that fits to the spring cage 16. The other side, i.e., the seating surface, is faced flat with a diamond wheel.

The spring cage 16 is formed from sheet aluminum-alloy material. Its upstream end is bowed or crowned in the upstream direction so that the spring-preloading force vector will at all times act on the poppet 17, well inside of the poppet-seating land, thereby enhancing self-alignment of the poppet by means of the spring cage.

The end-reference member 14 which locates and carries the fixed end of the spring and serves as a positive, open-position stop, is a simple screw-machine part, suitably of aluminum alloy.

The overall check-valve design thus-far described has been indicated as presently preferred, but it lends itself to several variations, one or more of which may later be preferred.

Figure 6:
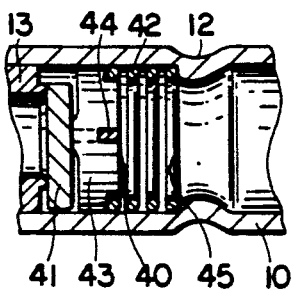
FIG. 6 is a fragmentary longitudinal section to show a first alternative arrangement for referencing spring action in a check valve that is otherwise as in FIG. 1.
Figure 7:
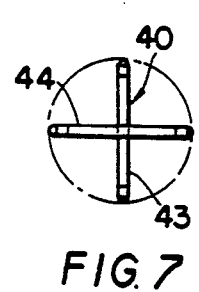
FIG. 7 is a right-end view in elevation of spring-cage structure in the arrangement of FIG. 6.

Several points of departure characterize the embodiment of FIGS. 6 and 7, which is concerned (1) with a different "spring-cage" configuration 40, (2) with a different manner of preload-vector application to a poppet 41, and (3) with a different means of fixedly referencing the downstream end of spring 42. Specifically, the spring cage 40 comprises two similarly contoured flat metal plates 43, 44 which are centrally slitted and engaged to complete a cruciform assembly. The contouring is such as to establish four equally spaced points of running-clearance, piloting guidance in the tube bore. The upstream edge-contouring of both plates 43, 44 determines a central axial projection or lobe for centered spring-force delivery to the flat downstream face of poppet 41; the downstream edge-contouring of plates 43, 44 establishes outer, spring-locating notched shoulders, at both radially outer ends of both plates, for spring location and engagement. Finally, the local inward displacement of tube material at 12 is utilized for a simple machining operation to define a shoulder 45, for fixed spring-seating reference to pipe 10.

Figure 8:
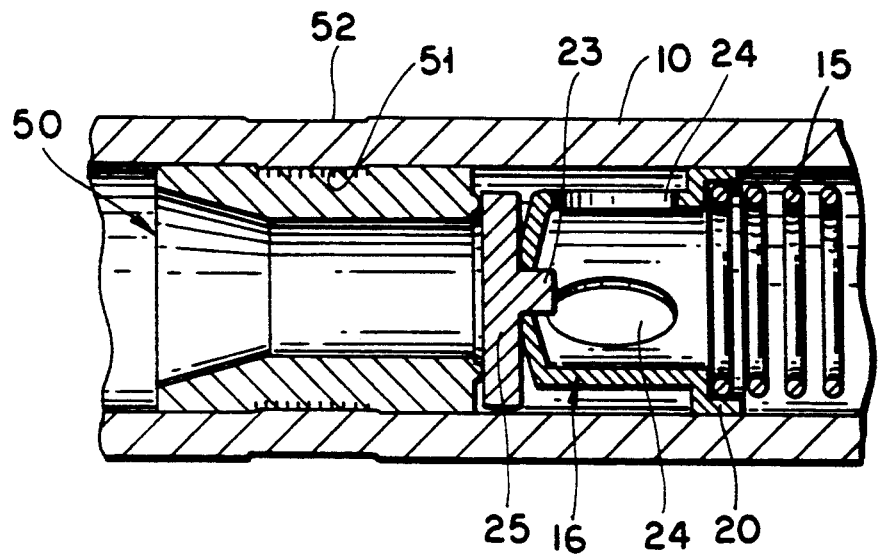
FIG. 8 is a fragmentary longitudinal section to show an alternative configuration for the fixing and sealing of a valve-seat member in a check-valve construction that is otherwise as in FIG. 1.

In the arrangement of FIG. 8, a seat member 50 of greater axial extent than member 13 of FIG. 1, is fitted to the tube bore. The axially central region of the outer surface of seat member 50 is characterized by a succession 51 of radially inward groove cuts that are axially narrow and of relatively short radially inward depth. A roller-swaging operation in the region 52 of pipe 10 displaces pipe material into squeezed locking engagement with the grooved region 51 of seat member 50, thereby also creating an axially spaced succession of sealed annular pockets, whereby the sealed fixation of seat member 50 is effected without use of an elastomeric component. Remaining parts of FIG. 8 are as described for FIGS. 1 to 3 and are therefore given the same reference numbers.

Figure 9:
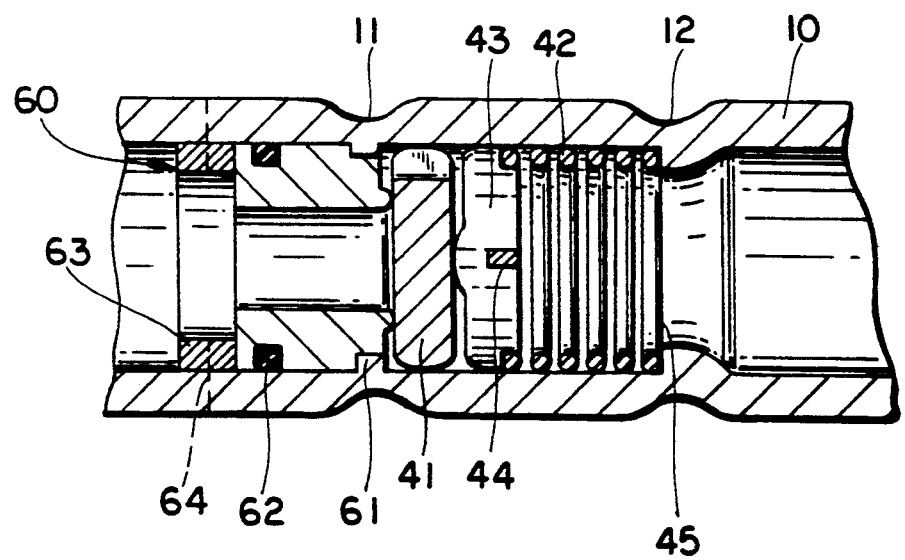
FIG. 9 is another fragmentary longitudinal section to show a further alternative configuration for the fixing and sealing of a valve-seat member.

In the arrangement of FIG. 9, the poppet, the spring cage, and the machine-shouldered reference for the downstream end of the spring are as described in connection with FIGS. 6 and 7 and, therefore, the same reference numbers are used for these features. The difference in FIG. 9 is in the seat member 60 and in its manner of fixed and sealed assembly to pipe 10. Both of the swaging operations at 11 and 12 are performed on pipe 10 prior to assembly of any parts therein. As part of or consecutive to the machining of the spring-referencing shoulder 45, a radially short, inward rib 61 is machined out of the continuous inwardly displaced tube material at 11; this rib 61 will be understood to afford an entering passage for assembly of poppet 41 from the inlet-port end, past rib 61, and into the internal volume between swaged locations, as by tilting the poppet to pass successive legs thereof through the slightly reduced opening at rib 61. The valve-seat member 60 is again annular, with a peripheral groove to locate an elastomeric O-ring 62 having sealed engagement to the pipe bore. Member 60 is also rabbeted at the downstream end of its outer cylindrical surface, whereby to axially locate against rib 61. Assembly is completed by a retaining ring 63 fitted to the pipe bore, in upstream abutment with the valve-seat member, and heavy radially directed dashed lines at 64 will be understood to suggest electron-beam welding to "stake" or "spike" the assembly of ring 63 to pipe 10. Retaining ring 63 may be a screw-machined aluminum-alloy component, but seat member 60 and its associated poppet 41 are preferably of harder material such as tungsten carbide, as is the case for all presently disclosed embodiments of the invention.

What is claimed is:

1. A check-valve construction, comprising a length of cylindrical pipe defining an elongate tubular body having a bore extending from an upstream end to a downstream end of one-way fluid-flow control along a longitudinal body axis, an annular seat member having an outer cylindrical surface with a radially inward circumferentially continuous peripheral groove between its axial ends, said pipe being circumferentially radially deformed into axially locking engagement with said groove to fixedly retain said seat member at a first axial location within said body, said member having an annular valve-seat surface centered on said axis at the downstream axial end of said member, said seat surface being of limited radial extent and at radial offset from the body bore, a poppet-valve member is downstream proximity to said seat member and (a) having a circular end face in confronting and radially lapping register with said seat surface and (b) having angularly spaced legs guided by the body bore, and means including a coil spring guided in said bore and having a downstream end that is fixedly referenced at a second axial location at downstream offset from said first axial location, said spring having an upstream end in compressionally loaded relation with the downstream end of said poppet-valve member.

2. A check-valve construction according to claim 1, wherein the annular valve-seat surface is flat and the seat-registering surface of said poppet-valve member is also flat, for flat-to-flat check-valve closure in a single radial plane.

3. A check-valve construction according to claim 1 in which an annular retainer body has an outer circumferential surface fitted to the pipe bore; said outer circumferential surface having a radially inward continuously peripheral groove between its axial ends, said pipe being circumferentially radially deformed into axially locking engagement with said groove to fixedly reference the downstream end of said spring at said second axial location.

4. A check-valve construction according to claim 1, in which an annular elastomeric seal member is contained in said groove, and in which the radial deformation of said pipe is in circumferentially continuous compression of said seal member.

5. A check-valve construction according to claim 1, in which a machined annular radially inward shoulder formation in the bore of the pipe provides the fixed reference for the downstream end of the spring.

6. A check-valve construction according to claim 5, in which said pipe is circumferentially continuously inwardly deformed at the region of said second axial location, and in which said shoulder formation is machined into the upstream end of the circumferentially continuous inward deformation.

7. A check-valve construction according to claim 1, in which the outer limits of said legs are angularly spaced convex portions of a single geometric sphere that is centered at the axial center of said poppet-valve member.

8. A check-valve construction according to claim 1, in which a spring-cage member is in axially interposed engagement with the upstream end of said spring and said poppet-valve member.

9. A check-valve construction according to claim 8, in which said spring-cage member is a cup formation having an upstream-end closure wall that is axially bowed for central engagement with the downstream end of said poppet-valve member, said cup formation having an axially elongate and perforated skirt portion at radially inward offset from the pipe bore, and a circumferential flange formation at the downstream end of said skirt portion, said flange formation having running clearance with the pipe bore and establishing a shoulder which is engaged to the upstream end of said spring.

10. A check-valve construction according to claim 9, in which the downstream end of said poppet-valve member is characterized by an axially projecting integrally formed central stud, and in which the center of the closure wall of said spring-cage member is centrally apertured and in locating engagement with said stud.

11. A check-valve construction according to claim 1, in which said poppet-valve member comprises axially spaced upstream and downstream faces defined by truncation at equal upstream and downstream offsets from the center of a geometric sphere, said legs being defined by and between three equal chordal truncations at equalangular spacing wherein each chordal truncation is of less than 120° about the central axis of the poppet-valve member.

12. As an article of manufacture, a check-valve assembly contained within a length of standard swageable cylindrical tubing, upstream and downstream circumferentially continuous radially inward swaging deformations in said tubing at axially spaced locations that are axially spaced from the respective ends of said tubing, thereby defining an inlet-porting cylindrical length for upstream connection to a fitted source of fluid-flow for one-way control by the check-valve assembly, and thereby also defining an outlet-porting cylindrical length for downstream connection to a fitted means to be served by such one-way control, an annular valve-seat member fixed to the tube bore by the upstream swaging deformation, an annular spring-seat referencing member fixed to the tube bore by the downstream swaging deformation, a poppet-valve member, and a spring member having a downstream end with seated engagement to said referencing member and applying compressionally preloaded force urging said poppet-valve member into valve-closing engagement with said valve seat member.

13. As an article of manufacture, a check-valve assembly contained within a length of standard swageable cylindrical tubing, upstream and downstream circumferentially continuous radially inward swaging deformations in said tubing at axially spaced locations that are axially spaced from the respective ends of said tubing, thereby defining an inlet-porting cylindrical length for upstream connection to a fitted source of fluid-flow for one-way control by the check-valve assembly, and thereby also defining an outlet-porting cylindrical length for downstream connection to a fitted means to be served by such one-way control, an annular valve-seat member fixed to the tube bore by the upstream swaging deformation, a poppet-valve member, and a spring member having a downstream end with seated engagement at said downstream swaging deformation and applying compressionally preloaded force urging said poppet-valve member into valve-closing engagement with said valve-seat member.

14. The article of claim 13, in which a machined radially inward shoulder formation in said downstream swaging deformation provides the downstream seat for said spring member.

15. The article of claim 12 or claim 15, wherein said annular valve-seat member has a flat annular valve-seat surface and said poppet-valve member has a seat-registering surface that is also flat, for flat-to-flat check-valve closure in a single radial plane.

16. The article of claim 1 or claim 12 or claim 13 wherein the material of said seat member is tungsten carbide.

17. The article of claim 1 or claim 12 or claim 13 wherein the material of said poppet-valve member is tungsten carbide.

* * * * *